United States Patent
Mikeal et al.

(10) Patent No.: US 12,479,487 B2
(45) Date of Patent: Nov. 25, 2025

(54) STORAGE AND TRANSPORTATION APPARATUS

(71) Applicant: K-Systems South, LLC, Douglasville, GA (US)

(72) Inventors: Mark Alan Mikeal, Douglasville, GA (US); Kathy Elaine Mikeal, Douglasville, GA (US); Mark Andrew Mikeal, Douglasville, GA (US); Mark Brandon Milner, Temple, GA (US)

(73) Assignee: K-Systems South, Douglasville, GA (US)

( * ) Notice: Subject to any disclaimer, the term of this patent is extended or adjusted under 35 U.S.C. 154(b) by 239 days.

(21) Appl. No.: 18/177,464

(22) Filed: Mar. 2, 2023

(65) Prior Publication Data
US 2024/0294200 A1     Sep. 5, 2024

(51) Int. Cl.
*B62B 3/06*     (2006.01)
*B62B 5/06*     (2006.01)
*B63B 34/26*     (2020.01)

(52) U.S. Cl.
CPC ............ *B62B 3/0606* (2013.01); *B62B 5/066* (2013.01); *B62B 5/067* (2013.01); *B63B 34/26* (2020.02);
(Continued)

(58) Field of Classification Search
CPC ....... B62B 3/0606; B62B 5/066; B62B 5/067; B62B 2202/403; B62B 2301/04;
(Continued)

(56) References Cited

U.S. PATENT DOCUMENTS 2,760,647 A * 8/1956 Saul, Jr. ............... B62B 3/02
                                                                        248/220.31
4,915,408 A * 4/1990 Clemence ............ A45C 13/385
                                                                        280/655

(Continued)

FOREIGN PATENT DOCUMENTS

CN         204674447 U * 9/2015
DE         19504771 A1 * 8/1995 ............. A47L 13/51
(Continued)

OTHER PUBLICATIONS

Translated KR-102192669-B1 (Year: 2025).*
(Continued)

*Primary Examiner* — James A Shriver, II
*Assistant Examiner* — Ian Bryce Shelton
(74) *Attorney, Agent, or Firm* — Jeremy Briggs

(57) ABSTRACT

A storage and transportation apparatus is disclosed. The apparatus may include a base frame and a base plate attached to the base frame. The base plate may be attached to the base frame such that the base plate may be disposed parallel to a base frame plane. The apparatus may further include an inverted U-shaped handrail attached to the base plate. The handrail may include a handrail side portion and a handrail top portion. The apparatus may further include a support member attached to the base frame and the handrail top portion. The support member may be disposed at a predefined angle relative to the base frame plane. The apparatus may further include a deformable strap removably attached to the base frame and the handrail top portion. The apparatus may additionally include a J-bar that may be removably attached to the handrail side portion via a fastener.

20 Claims, 6 Drawing Sheets

(52) U.S. Cl.
CPC ..... *B62B 2202/403* (2013.01); *B62B 2301/04* (2013.01)

(58) Field of Classification Search
CPC ....... B62B 3/10; B62B 5/061; B62B 2203/44; B63B 34/26
See application file for complete search history.

(56) References Cited

U.S. PATENT DOCUMENTS

| | | | | |
|---|---|---|---|---|
| 5,411,360 | A * | 5/1995 | Hilliker | B65G 49/062 108/53.5 |
| 6,206,385 | B1 * | 3/2001 | Kern | B62B 3/008 280/47.35 |
| 6,390,309 | B1 * | 5/2002 | Tucker | B63B 32/83 D6/552 |
| 6,450,514 | B1 * | 9/2002 | Ronca | B62B 3/108 280/47.35 |
| 6,793,223 | B2 * | 9/2004 | Ondrasik | B60B 33/0039 280/47.35 |
| 8,006,984 | B2 * | 8/2011 | Chubb | B65G 49/062 280/33.998 |
| 8,141,888 | B1 * | 3/2012 | Levasa | B62B 3/02 280/79.11 |
| 8,465,031 | B2 * | 6/2013 | Coghill, Jr. | B62B 1/14 280/47.35 |
| 8,690,167 | B1 | 4/2014 | Huntley et al. | |
| 9,162,528 | B2 * | 10/2015 | Kroening | B62B 3/04 |
| 9,333,922 | B2 | 5/2016 | LaVerack et al. | |
| 9,370,969 | B2 * | 6/2016 | Kroening | B60B 33/0018 |
| 9,821,828 | B2 * | 11/2017 | Kahler | B62B 3/10 |
| 9,932,058 | B2 * | 4/2018 | Holloway | B62B 3/02 |
| 10,376,045 | B1 * | 8/2019 | Poudrier | B62B 3/002 |
| 11,034,372 | B1 * | 6/2021 | Jordan | B62B 5/0003 |
| 11,097,759 | B1 * | 8/2021 | Poudrier | B62B 3/008 |
| 11,654,947 | B1 * | 5/2023 | Poudrier | B62B 3/008 211/13.1 |
| 2005/0067360 | A1 * | 3/2005 | Darval | B65D 85/48 211/41.1 |
| 2008/0217503 | A1 * | 9/2008 | Zhuang | B62B 3/02 248/558 |
| 2009/0212535 | A1 * | 8/2009 | Darling, III | B62B 13/18 280/651 |
| 2010/0052293 | A1 | 3/2010 | Brooks et al. | |
| 2010/0059950 | A1 * | 3/2010 | Coghill, Jr. | B62B 1/14 280/47.35 |
| 2015/0028555 | A1 * | 1/2015 | Kroening | B62B 3/10 29/428 |
| 2015/0028616 | A1 * | 1/2015 | Kroening | B60B 33/0026 296/35.3 |
| 2016/0347340 | A1 * | 12/2016 | Kahler | A47B 81/00 |
| 2018/0037245 | A1 * | 2/2018 | Kahler | B62B 3/025 |
| 2020/0094863 | A1 * | 3/2020 | Parrish | B60D 1/52 |
| 2020/0223462 | A1 * | 7/2020 | Ferree, Jr. | B62B 5/067 |
| 2020/0369309 | A1 * | 11/2020 | Nothern | B62B 3/10 |
| 2021/0086816 | A1 * | 3/2021 | Frame | B62B 3/102 |
| 2021/0229720 | A1 * | 7/2021 | Burns | B65D 19/42 |
| 2023/0219387 | A1 * | 7/2023 | McPheeters | B60D 1/54 280/407 |
| 2023/0356644 | A1 * | 11/2023 | Weskamp | B62B 1/20 |

FOREIGN PATENT DOCUMENTS

| | | | | |
|---|---|---|---|---|
| DE | 102006049551 | B4 * | 6/2011 | ............ B62B 3/108 |
| EP | 1188637 | A2 | 3/2002 | |
| GB | 2596921 | A * | 1/2022 | ............... B62B 3/10 |
| JP | 4735085 | B2 * | 7/2011 | ............... B62B 3/04 |
| KR | 102192669 | B1 * | 12/2020 | |
| KR | 102361689 | B1 * | 2/2022 | |

OTHER PUBLICATIONS

Cosco Truted Solutions, "Shifter Multi-Position Folding Hand Truck and Cart", Retrieved on Feb. 15, 2023, pp. 2 Available at : https://www.coscoproducts.com/collections/hand-trucks-anddollies/products/shifter-multi-position-folding-hand-truck-andcart?variant=38868093436089.

Shopee, "Multifunction Foldable Trolley Mini Trolley Heavy Duty Trolley Support 50K", Retrieved on Feb. 15, 2023, pp. 2 Available at : https://shopee.com.my/Multifunction-Foldable-Trolley-Mini-Trolley-Heavy-Duty-Trolley-Support-50KG-i.61858326.1390274085.

* cited by examiner

STORAGE AND TRANSPORTATION APPARATUS

TECHNICAL FIELD

The present disclosure relates to a storage and transportation apparatus and more specifically to a paddle craft storage and transportation apparatus that may facilitate a user to conveniently store and move a paddle craft in a home environment.

BACKGROUND

Paddle crafts such kayaks or canoes are used for recreational purposes. A paddle craft may be heavy and may have large dimensions. Therefore, users may find it difficult to store a paddle craft (e.g., when the paddle craft is not being used) and/or move the paddle craft. For example, a user may face inconvenience while storing a kayak in a home environment. Further, the user may have to apply considerable manual effort in moving the kayak from its storage location at home to, for example, a vehicle using which the user may transport the kayak to water (e.g., to beach).

There exist conventional wheeled transport devices that may enable users to transport paddle crafts. For example, a user may place a paddle craft on a wheeled transport device, and move the paddle craft by using device wheels. Such conventional wheeled transport devices may require the users to place one portion (e.g., a back portion) of the paddle craft on the device, and lift and push (or pull) the other paddle craft portion (e.g., a front portion) to move the device. Lifting and pushing (or pulling) a heavy paddle craft may cause inconvenience to users.

In addition, such conventional devices may not assist the users in all scenarios. For example, a conventional wheeled transport device may have limited utility when the user desires to move the paddle craft (which may have a large width) via a narrow home door.

Thus, there is a need for a paddle craft storage and transportation apparatus that may enable users to conveniently store and move a paddle craft in a home environment.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
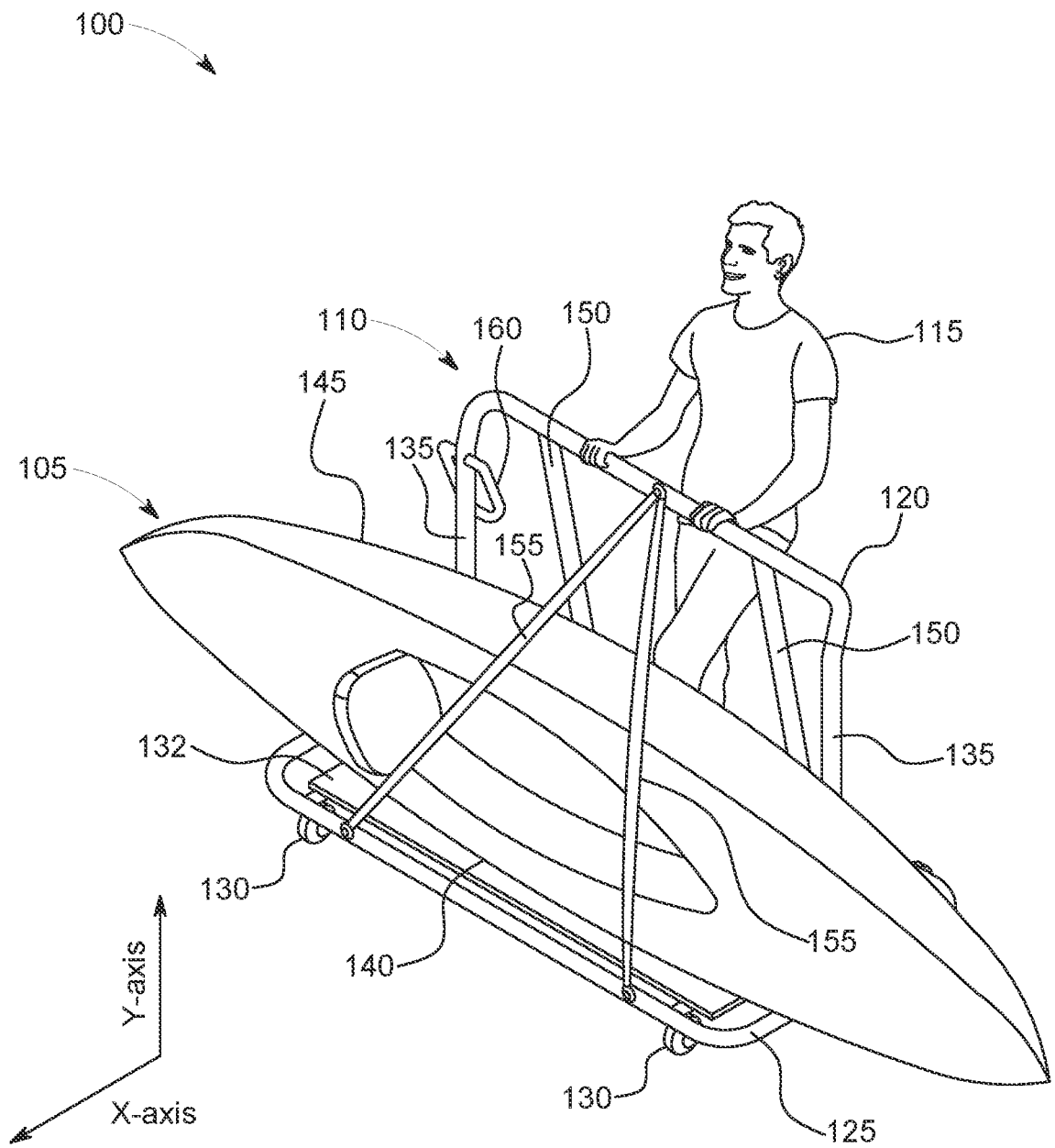
FIG. 1 depicts an example environment in which techniques and structures for providing the systems and methods disclosed herein may be implemented.

The present disclosure is directed towards a storage and transportation apparatus. The apparatus may be used to store and transport heavy artefacts, for example, paddle crafts in a home environment. The apparatus may include a base frame, and a base plate attached to the base frame. The base frame and the base plate may be rectangular, and the base plate may be disposed parallel to a base frame plane and within the four edges of the base frame. A user may place the paddle craft on the base plate to store the paddle craft on the apparatus. The apparatus may further include multi-directional wheels that may be attached to a base frame bottom portion. In some aspects, the multi-directional wheels may be caster wheels, and the apparatus may be moved in different directions by using the caster wheels. The apparatus may further include an inverted U-shaped handrail that may be perpendicularly attached to the base plate. The user may place the paddle craft on the base plate, and may pull (or push) the handrail to cause wheel movement. Pulling (or pushing) the handrail thus enables the user to transport the paddle craft from one location to another.

The apparatus may further include one or more deformable straps that may be attached to the base frame and a handrail top portion, when the paddle craft may be placed on the base plate. The deformable straps may ensure that the paddle craft does not skid off the base plate. In some aspects, the deformable straps may be locking retractable security straps that may be used to securely fasten the paddle craft on the apparatus.

The apparatus may further include one or more J-bars that may be removably attached to handrail side portions. The user may store the paddle craft on the J-bars (instead on storing on the base plate) when the user desires to store the paddle craft on the apparatus for a longer time duration. The J-bars may be configured to move (e.g., up or down) along a handrail side portion length, so that paddle crafts of different dimensions (e.g., widths) may be conveniently stored on the J-bars. The J-bars may also act as positive stops that may ensure that the paddle craft does not skid off the apparatus.

The present disclosure discloses a paddle craft storage and transportation apparatus that may facilitate the user to conveniently store and move the paddle craft in a home environment. The apparatus may enable the user to store the paddle craft at different slant angles on the apparatus, so that the user may move the paddle craft through narrow home doors. Further, the apparatus may enable the user to store a heavy paddle craft on the apparatus by using the J-bars, without damaging the apparatus base plate and/or home floor surface.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a watercraft or a paddle craft 105 that may be placed on a storage and transportation apparatus 110 (or apparatus 110).

The paddle craft 105 may be, for example, a kayak, a canoe, a dinghy, a paddleboard, and/or the like. In an exemplary aspect (as shown in FIG. 1), the paddle craft 105 may be a conventional kayak that may be made of plastic, fiberglass, polyethylene, Kevlar, a combination thereof, and/or any other similar material. Further, the paddle craft 105 may have a length in a range of 6 to 16 feet, and a width in a range of 2 to 4 feet. A user 115 may place the paddle craft 105 on the apparatus 110 to store the paddle craft 105 and/or to conveniently move the paddle craft 105 in a home environment (or outside).

The apparatus 110 may be lightweight, and users of different physiologies may easily move the apparatus 110. The apparatus 110 may include an inverted U-shaped handrail 120 (handrail 120), a base frame 125, and one or more wheels 130. The base frame 125 may be attached with a base plate 132. The base plate 132 may be disposed parallel to a base frame 125 plane (shown as X-axis in FIG. 1), and may be used by the user 115 to place and store the paddle craft 105 on the apparatus 110. Specifically, the user 115 may place the paddle craft 105 on the base plate 132 to store the paddle craft 105 on the apparatus 110. In some aspects, the base plate 132 may be disposed on the base frame 125, and may cover the base frame 125 partially or completely.

The handrail 120 may be attached to the base plate 132 such that handrail side portions 135 may be perpendicular to the base frame 125 plane. In some aspects, the handrail side portions 135 may be attached to a base plate 132 top portion (via attachment means, e.g., nut and bolt fasteners, screws, nails, and/or the like, or via welding). Further, the wheels 130 may be attached to a base frame 125 bottom portion (via attachment means, e.g., nut and bolt fasteners, screws, nails, and/or the like). In an exemplary aspect, the wheels 130 may be unidirectional or multi-directional caster wheels. The user 115 may move the paddle craft 105 by placing the paddle craft 105 on the base plate, and pushing (or pulling) the handrail 120 to cause wheel 130 movement.

As shown in FIG. 1, the apparatus 110 may enable the user 115 to place (and store) the paddle craft 105 "horizontally" on the base plate 132, such that a paddle craft first side edge 140 may be placed on the base plate 132 and a paddle craft second side edge 145 may be disposed or placed in proximity to handrail 120 top portion. Specifically, a paddle craft 105 base (or in other aspects, paddle craft 105 front portion) may "rest on" or "lean against" the handrail 120 side portions, as shown in FIG. 1.

Since the apparatus 110 enables the user 115 to store the paddle craft 105 horizontally such that the paddle craft 105 base may lean against the handrail side portions 135, the user 115 may easily transport the paddle craft through narrow home doors. A person ordinarily skilled in the art may appreciate that since a paddle craft (e.g., the paddle craft 105) may have a width that may be greater than or similar to a conventional home door width, the user 115 may find it difficult to move the paddle craft 105 through the home door if the paddle craft 105 is placed flat on the base plate 132. Therefore, by enabling the user 115 to place the paddle craft 105 on the base plate 132 such that the paddle craft 105 base may lean against the handrail side portions 135, the apparatus 110 may facilitate the user 115 to conveniently move the paddle craft 105 through a narrow home door.

Figure 4:
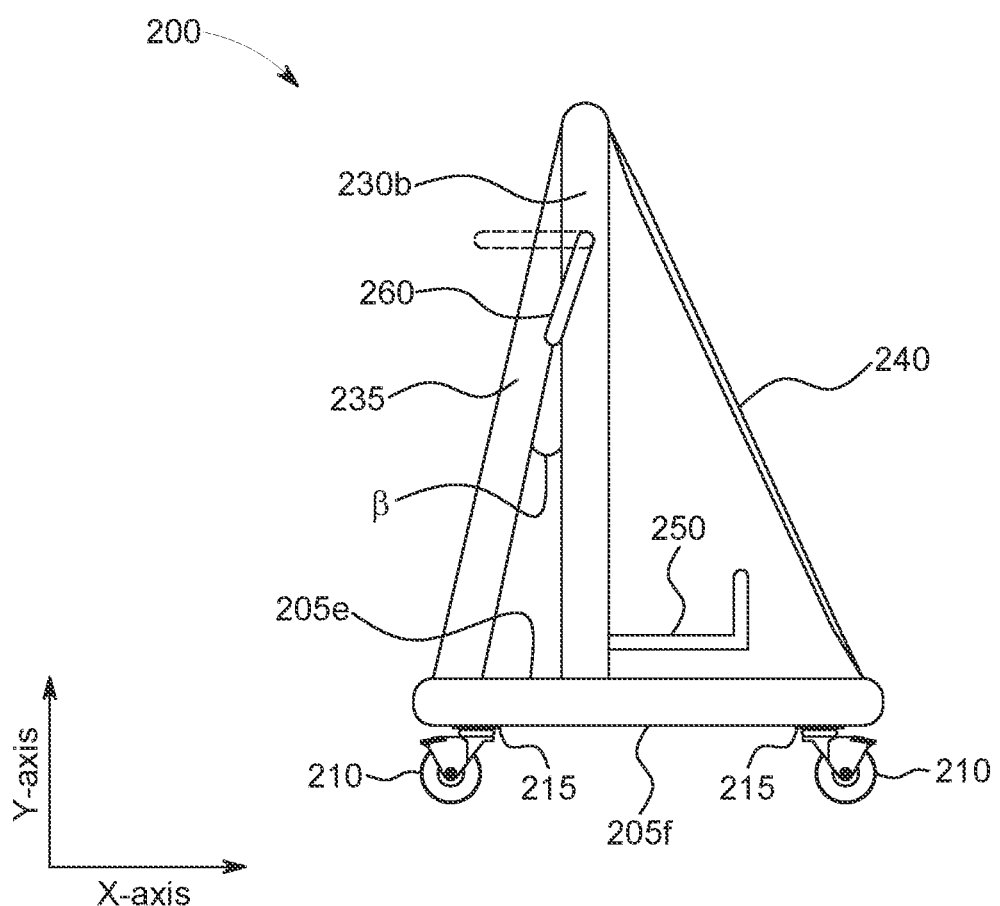
FIG. 4 depicts a side view of the first storage and transportation apparatus of FIG. 2 in accordance with the present disclosure.

The apparatus 110 may further include one or more support members 150 that may be attached to the handrail 120 top portion and the base frame 125. The support members 150 may be disposed or slanted at a predefined angle related to the handrail 120 plane (as shown in FIG. 4). Slanted support members 150 may ensure that the apparatus 110 does not topple when the user 115 places the paddle craft 105 (which may be heavy) on the apparatus 110.

The apparatus 110 may additionally include one or more deformable straps 155 that may be removably attached to the handrail 120 top portion and the base frame 125, when the paddle craft 105 may be stored on the base plate 132. The straps 155 may ensure that the paddle craft 105 does not slip off the base plate 132 when the paddle craft 105 is stored on the base plate 132 and/or when the apparatus 110 is moved.

The apparatus 110 may further include a handle 160 that may be attached to the handrail side portion 135. The handle 160 may be attached to (and partially "wrap" around) the handrail side portion 135 via fastening means such that the handle 160 may be rotated pivotally about the fastening means to move from a "resting" position to an "extended" position. In some aspects, in the extended position, the handle 160 may be disposed perpendicular to a handrail side portion longitudinal axis. Further, in the resting position, the handle 160 may rest on the handrail side portion 135, such that the handle 160 may be substantially parallel to the handrail side portion longitudinal axis.

In some aspects, the handle 160 may be U-shaped. Further, the fastening means may enable the handle 160 to "lock" in the extended position, when the user 115 moves the handle 160 from the resting position to the extended position. In operation, the user 115 may move the handle 160 from the resting position to the extended position when the user 115 desires to pull the apparatus 110 via the handle 160. Further, when not in use, the user 115 may move the handle 160 back to the resting position from the extended position.

The apparatus 110 may include one or more additional elements (e.g., J-bars, hooks, etc.) to enhance apparatus 110 utility and/or structural integrity. Structural details of the apparatus 110 and the additional elements are described in detail in conjunction with subsequent figures.

Although the description above describes an aspect where the apparatus 110 stores a paddle craft, the present disclosure is not limited to storing and transporting paddle crafts only. The apparatus 110 may be used to store and transport other similar heavy and/or large artefacts, e.g., electronic equipment, decorative items, furniture, and/or the like.

Figure 2:
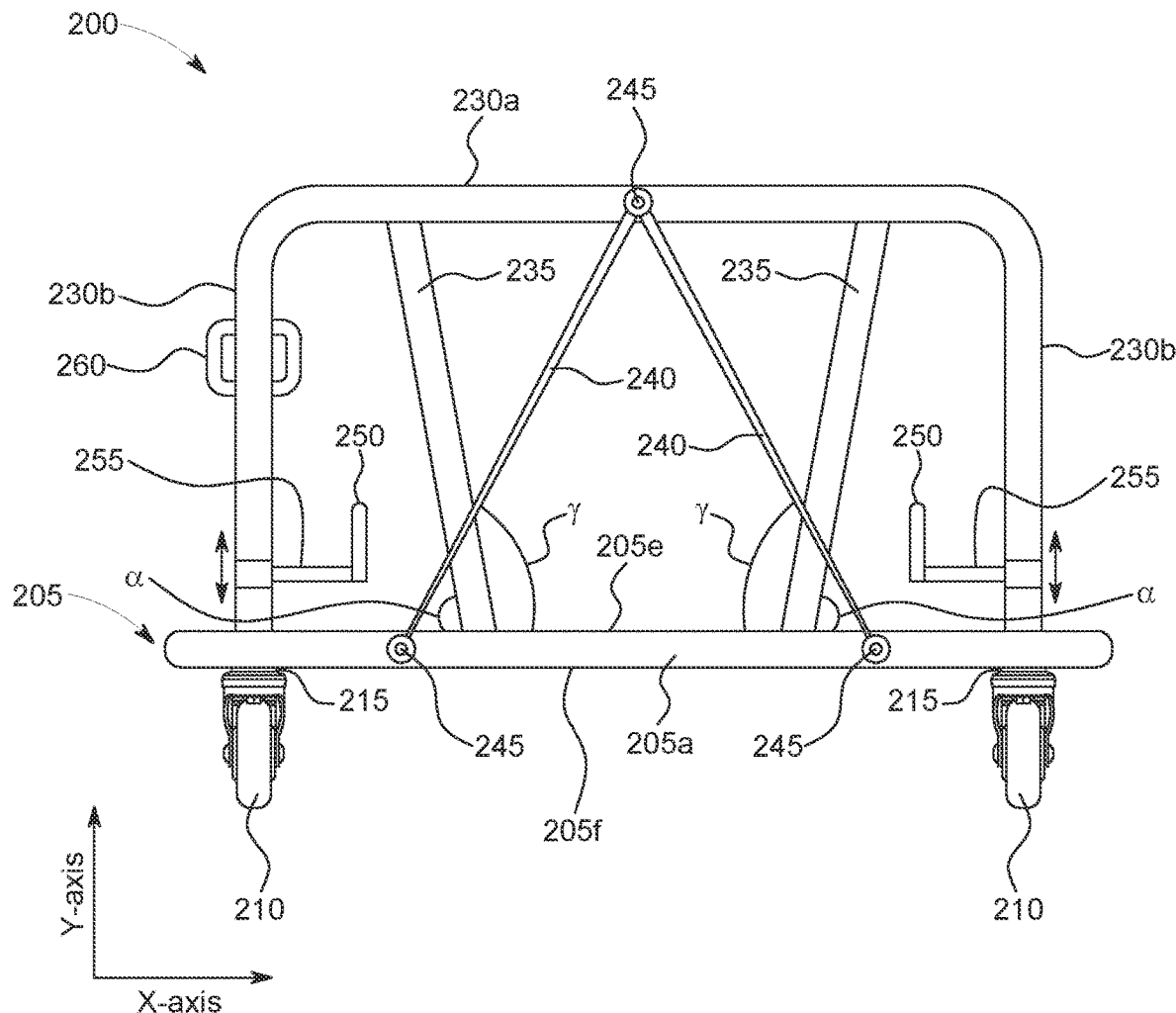
FIG. 2 depicts a front view of an example first storage and transportation apparatus in accordance with the present disclosure.

FIG. 2 depicts a front view of an example first storage and transportation apparatus 200 (apparatus 200) in accordance with the present disclosure. While describing FIG. 2, references may be made to FIGS. 3 and 4 that depict a top view and a side view of the apparatus 200, respectively.

Figure 3:
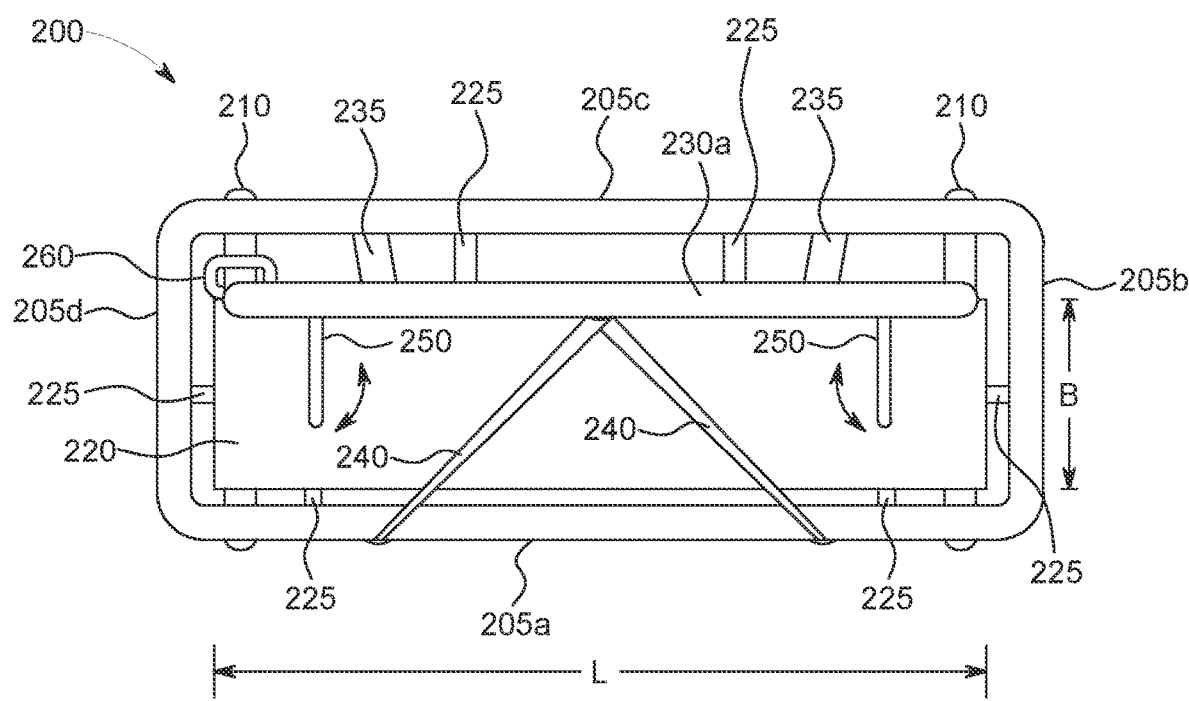
FIG. 3 depicts a top view of the first storage and transportation apparatus of FIG. 2 in accordance with the present disclosure.

The apparatus 200 may be same as the apparatus 110 described in conjunction with FIG. 1. The apparatus may include a base frame 205 that may be a rectangular frame having four elongated members. Specifically, the base frame 205 may include a first member 205a, a second member 205b, a third member 205c and a fourth member 205d, as shown in FIG. 3. The first member 205a and the third member 205c may be perpendicularly attached to the second member 205b and the fourth member 205d. In some aspects, the first member 205a, the second member 205b, the third member 205c and the fourth member 205d may be integrated with each other to form a unitary structure. In other aspects, the base frame 205 may be of any other shape, e.g., square, oval, etc.

Each member 205a-d may be hollow or solid, and may have a cylindrical or cuboidal shape. The members 205a-d may be lightweight, and may be made of aluminum, Poly Vinyl Chloride (PVC), plastic, iron, steel, a combination thereof, or any other similar material. Each member 205a-d may have a width or diameter in a range of 0.5 to 2 inches. In a preferred aspect, each member 205a-d has a width or diameter of 1 inch.

In some aspects, a first member 205a length may be equivalent to a third member 205c length. The first member 205a length and the third member 205c length may be in a range of 45 to 55 inches. In a preferred aspect, the first member 205a length and the third member 205c length may be 48 inches. Further, a second member 205b length may be equivalent to a fourth member 205d length. The second member 205b length and the fourth member 205d length may be in a range of 15 to 25 inches. In a preferred aspect, the second member 205b length and the fourth member 205d length may be 18 inches.

The base frame 205 (specifically each member 205a-d) may further include a frame top surface 205e and a frame bottom surface 205f. The frame bottom surface 205f may be attached with one or more wheels 210 via attachment means 215. The attachment means 215 may be, for example, nut and bolt fasteners, screws, nails, and/or the like. The wheels 210 may be unidirectional or multi-directional caster wheels. In a preferred aspect, the wheels 210 may be multi-directional caster wheels that may enable the user 115 to conveniently move the apparatus 200 in different directions. Each wheel 210 may be configured to swivel relative to the attachment means 215, and may be configured to move on different surface types (i.e., the wheels 210 may be all terrain wheels).

The apparatus 200 may include three to six wheels 210. In a preferred aspect, the apparatus 200 may include four wheels 210. Furthermore, each wheel 210 may have a diameter in a range of 4 to 8 inches. In a preferred aspect, each wheel 210 may have a diameter of 6 inches.

The apparatus 200 may further include a base plate 220 (same as the base plate 132). The base plate 220 may be made of lightweight and non-skid material, e.g., aluminum, steel, iron, and/or the like. As described in conjunction with FIG. 1, the user 115 may place (e.g., place horizontally) and store the paddle craft 105 on the base plate 220. The base plate 220 may also include a layer of fabric, foam or plastic over a base plate top surface that may ensure that the paddle craft 105 does not slip/skid off the base plate 220.

The base plate 220 may be disposed parallel to a base frame plane (shown as X-axis in FIG. 2). Further, the base plate 220 may be disposed on the base frame plane (as shown in FIGS. 2, 3, 4) or may be disposed above or under the base frame plane. Furthermore, in some aspects, the base plate 220 may be attached to the base frame 205 such that one or more base plate edges (e.g., left, right, top, and/or bottom edges of rectangular base plate 220) may be enclosed or disposed within the base frame 205, as shown in FIG. 3. In further aspects, the base plate 220 may be attached to the base frame 205 via one or more connectors 225. The connectors 225 may be metal truss connector plates, PVC connector plates, tie rods, and/or the like.

In some aspects, a base plate 220 length "L" may be equivalent to the first member 205a length and the third member 205c length. In other aspects (as shown in FIG. 3), the base plate 220 length "L" may be less than the first member 205a length and the third member 205c length. For example, the base plate 220 length "L" may be in a range of 40 to 50 inches. In yet another aspect (not shown), the base plate 220 length "L" may be greater than the first member 205a length and the third member 205c length. In this case, the base plate 220 may be disposed above or under the base frame plane.

Further, in some aspects, a base plate 220 breadth "B" may be equivalent to the second member 205b length and the fourth member 205d length. In other aspects (as shown in FIG. 3), the base plate 220 breadth "B" may be less than the second member 205b length and the fourth member 205d length. For example, the base plate 220 breadth "B" may be in a range of 12 to 20 inches. In yet another aspect (not shown), the base plate 220 breadth "B" may be greater than the lengths of the second member 205b length and the fourth member 205d length. In this case, the base plate 220 may be disposed above or under the base frame plane.

Furthermore, in some aspects, each base plate edge may be disposed at a predefined distance from respective members 205a-d. In other aspects, one or more base plate edges (e.g., left, right, top, and/or bottom edges) may be disposed at different distances from respective members 205a-d (as shown in FIG. 3). For example, the base plate 220 may be disposed at a greater distance from the third member 205c than a distance from the first member 205a. Similarly, the base plate 220 may be disposed at a greater distance from the fourth member 205d than a distance from the second member 205b. Stated another way, the base plate 220 may be placed towards the first member 205a, and away from the third member 205c (and may not be placed in middle of the base frame 205).

Base plate 220 arrangement relative to the base frame 205, as described above, is for illustrative purpose, and should not be construed as limiting the present disclosure scope. Different base plate 220 arrangements are feasible within the present disclosure scope.

The apparatus 200 may further include an inverted U-shaped handrail that may include a handrail top portion 230a and a pair of handrail side portions 230b (collectively referred as handrail 230). The handrail 230 may be perpendicularly attached to the base plate 220 (or the base frame 205) via the handrail side portions 230b. Specifically, each handrail side portion 230b may include a handrail side portion proximal end and a handrail side portion distal end. The handrail 230 may be perpendicularly attached to the base plate 220 via handrail side portion distal ends. Further, the handrail side portion proximal ends may be attached to the handrail top portion 230a, such that the handrail top portion 230a may be perpendicular to the handrail side portions 230b, as shown in FIG. 2.

The handrail 230 may be attached to the base plate 220 via welding, or any known attachment means (e.g., plate fasteners, nut and bolt fasteners, etc.). Further, in some aspects, the handrail 230 may be attached to a base plate 220 edge that may be proximate to the third member 205c. In this manner, the handrail 230 may not occupy substantial base plate 220 area, and thus the user 115 may conveniently place the paddle craft 105 on the base plate 220.

The user 115 may place the paddle craft 105 on the base plate 220, and pull or push the apparatus 200 via the handrail 230 to move the paddle craft 105 from one location to another (e.g., from a home storage location to a vehicle parking location). The handrail 230 may be hollow or solid, and may be shaped as a cylinder or a cuboid. The handrail 230 may be made of sturdy and lightweight material, which may be same as or different from base frame 205 material. For example, the handrail 230 may be made of PVC or aluminum.

In some aspects, a handrail side portion 230b length may be in a range of 40 to 50 inches. In a preferred aspect, the handrail side portion 230b length may be 43.5 inches. Further, a handrail top portion 230a length may be in a range of 40 to 50 inches. In a preferred aspect, the handrail top portion 230a length may be 44 inches.

Although the description above describes an aspect where the handrail 230 may be attached to the base plate 220, in an alternative aspect, the handrail 230 may be attached to one or more members 205a-d (i.e., to the base frame 205). Stated another way, the present disclosure is not limited to the handrail 230 being attached to the base plate 220.

The apparatus 200 may further include one or more support members 235 that may be attached to the base frame 205 and the handrail top portion 230a. The support member 235 may include a support member distal end and a support member proximal end. The support member distal end may be attached to the third member 205c and the support member proximal end may be attached to the handrail top portion 230a, as shown in FIG. 3. The support member 235 distal end may be attached to the frame top surface 205e. In an exemplary aspect, the apparatus 200 may include two support members 235. In other aspects (not shown), the apparatus 200 may include more than two support members 235. In yet another aspect, the apparatus 200 may include one support member 235.

In some aspects, each support member 235 may be disposed at a first predefined angle "α" relative to the base frame 205 plane (shown as X-axis), as shown in FIG. 2. The angle "α" may be in a range of 60 to 80 degrees. In additional aspects, each support member 235 may be disposed at a second predefined angle "β" relative to the handrail side portion 230b or handrail 230 plane, shown as Y-axis in FIG. 4. The angle "β" may be in a range of 20 to 40 degrees.

Exemplary support member 235 attachment arrangement described above may enhance apparatus 200 structural integrity and stability. Specifically, since the support members 235 are "titled" or "slanted" relative to the handrail 230 plane (or the base frame 205 plane), the apparatus 200 may not topple when a heavy paddle craft is supported or rested against the handrail side portions 230b, as shown in FIG. 1.

In some aspects, the support members 235 may be made of similar material as the handrail 230 and/or the base frame 205. Further, each support member 235 too may shaped be as a hollow or solid cylinder or cuboid.

The apparatus 200 may further enable the user 115 to fasten the paddle craft 105 to the apparatus 200, when the user 115 places and stores the paddle craft 105 on the apparatus 200. Specifically, the apparatus 200 may include one or more deformable or elastic straps 240 that may be removably attached between the base frame 205 and the handrail top portion 230a to fasten the paddle craft 105 to the apparatus 200 when the paddle craft 105 may be placed on the base plate 220. Each deformable strap 240 may be a locking retractable security strap that may be made of neoprene, latex, spandex, elastic cotton, elastic nylon, elastic polyester, and/or the like. Each deformable strap 240 may be attached to the base frame 205 and the handrail top portion 230a by using a first fastener 245, which may be, for example, hook and loop fastener, snap fastener, iron belt fastener, fabric fastener, and/or the like.

In the exemplary aspect shown in FIGS. 2, 3 and 4, the apparatus 200 may include two deformable straps 240. In other aspects, the apparatus 200 may include more than or less than two deformable straps 240. One end (e.g., a proximal end) of each deformable strap 240 may be removably attached to a center portion of the handrail top portion 230a (as shown in FIG. 2) by using the first fastener 245. The other end (e.g., a distal end) of each deformable strap 240 may be removably attached to the first member 205a by using the first fastener 245. Further, in some aspects, each deformable strap 240 may be disposed at a third predefined angle "γ" relative to the base frame 205 plane, shown as X-axis in FIG. 2.

Exemplary deformable strap 240 attachment arrangement described above may ensure that the deformable strap 240 securely fastens a substantial paddle craft 105 portion or area, and the paddle craft 105 may not skid off the base plate 220 when the paddle craft 105 may be placed/stored on the apparatus 200.

In further aspect, the apparatus 200 may include one or more J-bars 250 that may be attached to the handrail side portions 230b via second fasteners 255. A person ordinarily skilled in the art may appreciate that the paddle craft 105 may be heavy, and storing the paddle craft 105 on the base plate 220 for a long time duration may exert considerable force (e.g., gravitational force) or weight on the base plate 220. The J-bars 250 may alleviate the force on the base plate 220.

The user 115 may place the paddle craft 105 on the J-bars 250 (and may not place the paddle craft 105 on the base plate 220) when the user 115 desires to store the paddle craft 105 on the apparatus 200 for a long time duration. The J-bars 250 may also act as positive stops that may ensure that the paddle craft 105 does not slide off the apparatus 200. The J-bars 250 may be, for example, padded cradle bar that may be made of iron, steel, aluminum, and/or the like.

The second fasteners 255 may be, for example, hinge fasteners (e.g., rivet hinge fasteners), corner fasteners, metal brackets, casement fasteners, and/or the like. In some aspects, the second fasteners 255 may enable the user 115 to move (e.g., up or down, as shown in FIG. 2) the J-bars 250 along a handrail side portion 230b length, and fasten the J-bars 250 at a desired location on the handrail side portion 230b. This way, the user 115 may adjust J-bar 250 position on the handrail side portion 230b based on a paddle craft 105 width. For example, for a paddle craft with a greater width, the J-bars 250 may be disposed "down" on the handrail side portions 230b in proximity to the base frame 205.

In further aspects, the second fasteners 255 may enable the user 115 to rotate the J-bars 250 axially relative a handrail side portion longitudinal axis, as shown in FIG. 3. The user 115 may rotate the J-bars 250 and place them parallel to a handrail 230 plane when the user 115 may not use the J-bars 250. In additional aspects, the user 115 may remove the J-bars 250 and the second fasteners 255 from the apparatus 200 when the user 115 may not desire to use the J-bars 250 to store the paddle craft 105.

The apparatus 200 may further include a handle 260 that may be attached to the handrail side portion 230b via fastening means. The handle 260 may be same as the handle 160 described in conjunction with FIG. 1. As described above, the user 115 may move the handle 260 from the resting position to the extended position when the user 115 desires to pull the apparatus 200 via the handle 260. Handle resting and extended positions are shown in FIG. 4.

In some aspects, some or all components of the apparatus 200 described above may be made of water-resistant or water-repellant material, so that the apparatus 200 may be water proof and may not get damaged by water. In additional aspects, the handrail 230 and the support member 235 may be collapsible or foldable, so that the user 115 may dispose the handrail 230 and the support member 235 parallel to the base frame 205 plane when the apparatus 200 may not be in use. This may make the apparatus 200 portable. In this case, the handrail 230 and the support member 235 may include one or more fastening mechanisms (not shown) that may enable the user 115 to fold the handrail 230 and the support member 235.

The apparatus 200 may further include one or more anti-theft protection means (not shown). For example, the wheels 210 and/or the deformable straps 240 may include combination locks or similar protection means to ensure that the apparatus 200 and/or the paddle craft 105 may not get stolen or moved. The apparatus 200 may further include an intruder alarm system that may output an audio alarm when an intruder attempts to unlock the protection means, or is in proximity to the apparatus 200.

In additional aspects, the apparatus 200 may include one or more drive motors that may control wheel 210 movement, and an onboard controller configured to control drive motor actuation. The onboard controller may be configured to communicatively couple with a user device (e.g., a mobile phone, a laptop, a tablet, a computer, etc.), and receive commands from the user device. In an exemplary aspect, the user 115 may send movement commands to the onboard controller via the user device. The onboard controller may receive user commands, and may actuate the drive motors to cause wheel 210 movement. In this case, the user 115 may not be required to pull or push the handrail 230 to cause wheel 210 movement. Instead, the user 115 may cause (and control) wheel 210 movement by using the user device.

Figure 5:
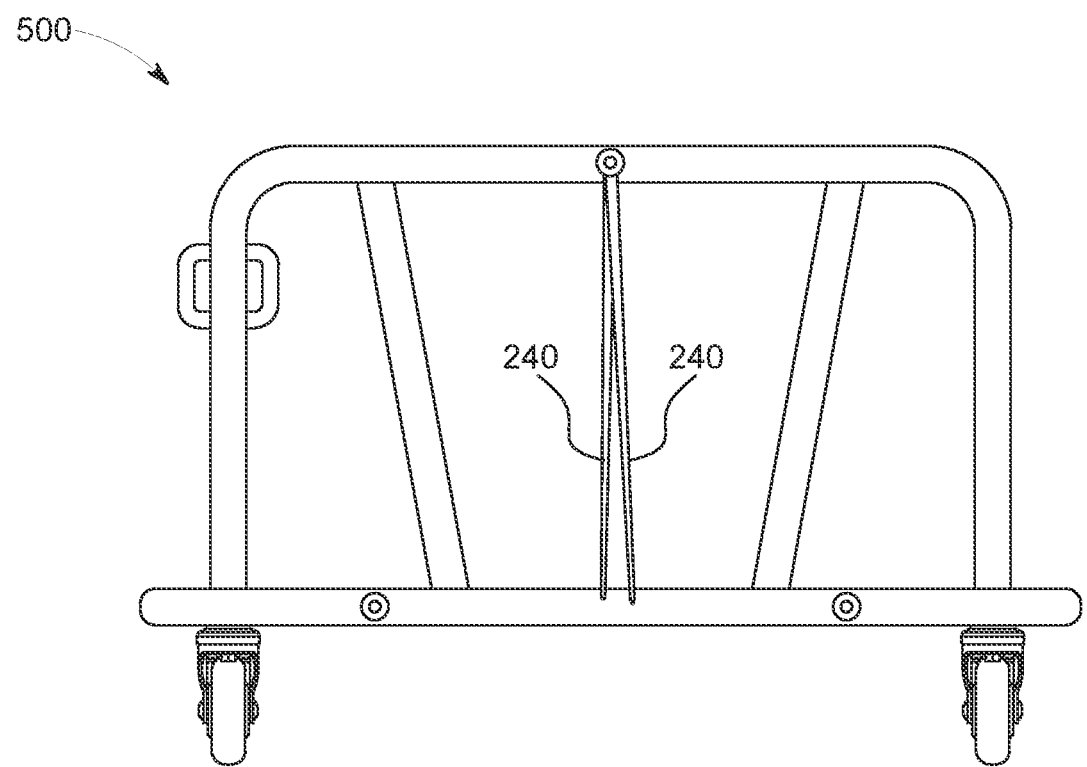
FIG. 5 depicts a front view of an example second storage and transportation apparatus in accordance with the present disclosure.

FIG. 5 depicts a front view of an example second storage and transportation apparatus 500 (apparatus 500) in accordance with the present disclosure. The apparatus 500 may be same as or similar to the apparatus 200, however the apparatus 500 may not include the J-bars 250 and the second fasteners 255.

In the exemplary aspect depicted in FIG. 5, the user 115 may place the paddle craft 105 on the base plate 220 and use the apparatus 200 to move the paddle craft 105 from one location to another. In additional aspects, while operating the apparatus 500, the user 115 may use the straps 240 (or an additional strap, not shown) to "lift" the paddle craft off from the base plate 220 when the user 115 desires to store the paddle craft 105 for a long time duration. For example, the user 115 may attach one end of the strap 240 (or the additional strap) to the handrail top portion 230a, then wrap the strap 240 around the paddle craft 105 width, and then attach the other end of the strap 240 back to the handrail top portion 230a. This way, the user 115 may "hang" the paddle craft 105 on the handrail 230, and thus raise/lift the paddle craft 105 off from the base plate 220.

Remaining apparatus 500 elements are same as apparatus 200 elements, and are thus not described here for the sake of simplicity and conciseness.

Figure 6:
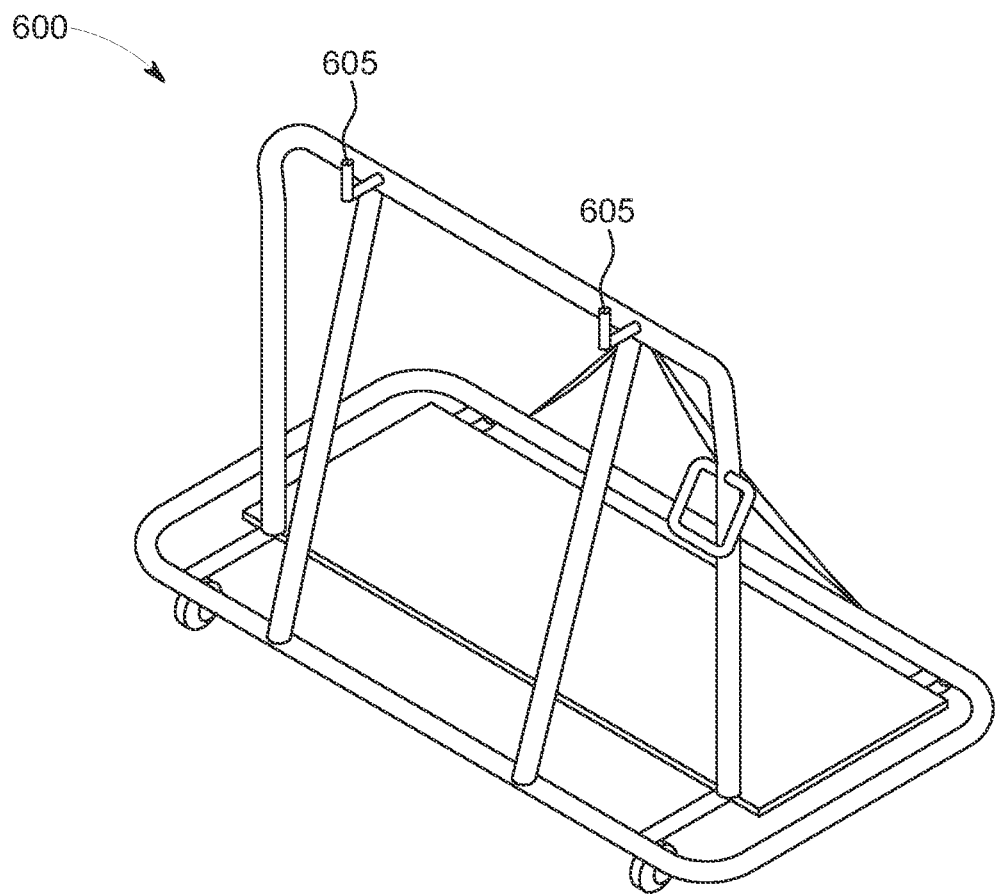
FIG. 6 depicts a back isometric view of an example third storage and transportation apparatus in accordance with the present disclosure.

FIG. 6 depicts a back isometric view of an example third storage and transportation apparatus 600 (apparatus 600) in accordance with the present disclosure. The apparatus 600 may be same as the apparatus 200/500, however the apparatus 600 may additionally include one or more J-hooks 605 that may be attached to a back side of the handrail top portion 230a. The J-hooks 605 may be made of iron, steel, aluminum, plastic, copper, a combination thereof, and/or the like.

The user 115 may store one or more items on the J-hooks 605, which may enhance user convenience of using the apparatus 600. For example, the user 115 may hang a handbag or store a pedal on the J-hooks 605.

The apparatus 600 may include more or less than two J-hooks 605 (shown in FIG. 6). Further, in additional aspects, the J-hooks 605 may also be attached to other apparatus 600 components, e.g., in addition to or alternative to the handrail top portion 230a.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An apparatus comprising:
   a base frame;
   a base plate attached to the base frame such that the base plate is disposed parallel to a base frame plane;
   an inverted U-shaped handrail attached to the base plate, wherein the handrail comprises a handrail side portion and a handrail top portion;
   a support member attached to the base frame and the handrail top portion, wherein the support member is disposed at a first predefined angle relative to the base frame plane;
   a deformable strap removably attached to the base frame and the handrail top portion; and
   a J-bar removably attached to the handrail side portion via a hinge fastener, wherein the J-bar is configured to axially rotate relative to a handrail side portion longitudinal axis via the hinge fastener.

2. The apparatus of claim 1, wherein the base frame comprises a first elongated member, a second elongated member, a third elongated member and a fourth elongated member.

3. The apparatus of claim 2, wherein the first elongated member and the third elongated member are perpendicularly attached to the second elongated member and the fourth elongated member.

4. The apparatus of claim 1, wherein the base frame comprises a base frame top surface and a base frame bottom surface.

5. The apparatus of claim 4, wherein the support member is attached to the base frame top surface.

6. The apparatus of claim 4 further comprising a wheel attached to the base frame bottom surface.

7. The apparatus of claim 6, wherein the wheel is a multi-directional caster wheel.

8. The apparatus of claim 1, wherein the J-bar is configured to move along a handrail side portion length via the hinge fastener.

9. The apparatus of claim 1, wherein the deformable strap is removably attached to a center portion of the handrail top portion.

10. The apparatus of claim 1, wherein the support member is disposed at a third predefined angle relative to the handrail side portion.

11. The apparatus of claim 1, wherein the handrail side portion comprises a handrail side portion proximal end and a handrail side portion distal end.

12. The apparatus of claim 11, wherein the handrail top portion is perpendicularly attached to handrail side portion via the handrail side portion proximal end.

13. The apparatus of claim 11, wherein the handrail is perpendicularly attached to the base plate via the handrail side portion distal end.

14. The apparatus of claim 1, wherein the support member comprises a support member proximal end and a support member distal end, wherein the support member is attached to the base frame via the support member distal end, and wherein the support member is attached to the handrail top portion via the support member proximal end.

15. An apparatus comprising:
    a base frame;
    a base plate attached to the base frame such that the base plate is disposed parallel to a base frame plane;
    an inverted U-shaped handrail attached to the base plate, wherein the handrail comprises a handrail side portion and a handrail top portion;
    a support member attached to the base frame and the handrail top portion, wherein the support member is disposed at a first predefined angle relative to the base frame plane; and
    a J-bar removably attached to the handrail side portion via a hinge fastener, wherein the J-bar is configured to move along a handrail side portion length and axially rotate relative to a handrail side portion longitudinal axis via the hinge fastener.

16. The apparatus of claim 15 further comprising a wheel attached to a base frame bottom surface.

17. An apparatus comprising:
    a base frame;
    a base plate attached to the base frame such that the base plate is disposed parallel to a base frame plane;
    an inverted U-shaped handrail attached to the base plate, wherein the handrail comprises a handrail side portion and a handrail top portion;
    a support member attached to the base frame and the handrail top portion, wherein the support member is disposed at a first predefined angle relative to the base frame plane;
    a deformable strap removably attached to the base frame and the handrail top portion;
    a J-bar removably attached to the handrail side portion via a hinge fastener, wherein the J-bar is configured to move along a handrail side portion length and axially rotate relative to a handrail side portion longitudinal axis via the hinge fastener; and
    a wheel attached to a base frame bottom portion.

18. The apparatus of claim 1, wherein the J-bar is configured to rotate between a first position and a second position, wherein in the first position the J-bar is located parallel to a handrail plane when the J-bar is not in use, and wherein in the second position the J-bar is located perpendicular to the handrail plane when the J-bar is in use.

19. The apparatus of claim 1, wherein the deformable strap is removably attached to the base frame and the handrail top portion via at least one of: a hook and loop fastener, a snap fastener, an iron belt fastener, or a fabric fastener.

20. The apparatus of claim 1 further comprising one or more J-hooks that are attached to a back surface of the handrail top portion.

* * * * *